FIG. 1

March 31, 1942.  A. S. FITZGERALD  2,277,849
ELECTRICAL CONTROL SYSTEM
Filed Aug. 15, 1938  2 Sheets-Sheet 2

INVENTOR
Alan S. Fitzgerald

Patented Mar. 31, 1942

2,277,849

UNITED STATES PATENT OFFICE 2,277,849

ELECTRICAL CONTROL SYSTEM

Alan S. Fitz Gerald, Wynnewood, Pa., assignor to Leeds & Northrup Company, Philadelphia, Pa., a corporation of Pennsylvania Application August 15, 1938, Serial No. 225,071

31 Claims. (Cl. 172—239)

This invention relates to electrical control systems and more particularly to self-balancing bridges and analogous arrangements.

Many electrical control systems employed for a number of different purposes make use of bridge circuits or equivalent electrical balance systems and essentially comprise instrumentalities for detecting departure from a condition of balance, and one or more variable elements controlled by the said instrumentalities for automatically maintaining a balanced condition.

One representative application of the self-balancing bridge or balance principle to which my invention is particularly applicable is the remote control and transmission of mechanical movement or displacement. Measuring systems of the type which make comparison between a sample to be measured and a standard element likewise involve automatic balancing methods. Automatically balanced bridges of the type comprising linear and non-linear impedance elements form the essential principles of many automatic systems for regulating voltage and other quantities; many other applications will be apparent to those skilled in the art.

My invention may with advantage be carried out with saturating reactor arrangements of the type I have described in United States Letters Patent #2,027,312.

It is an object of my invention to provide improved circuits and methods for detecting unbalance and for effecting the restoration of a balanced condition.

It is a further object of my invention to accomplish the above result with apparatus of an exceptionally reliable type, combining a high order of sensitivity with freedom from delicate contacts, moving parts, or apparatus requiring maintenance, attention, or renewal.

It is yet another object of my invention to increase the responsiveness of such apparatus to inputs of very low magnitude by providing arrangements for applying the full supply voltage to the circuit intermittently.

These and other novel features which I believe to be characteristic of my invention will be set forth with particularity in the appended claims. My invention itself, however, both as to its organization and method of operation, together with further objects and advantages thereof, may best be understood with reference to the following description taken in connection with the accompanying drawings, in which:

Figure 1:
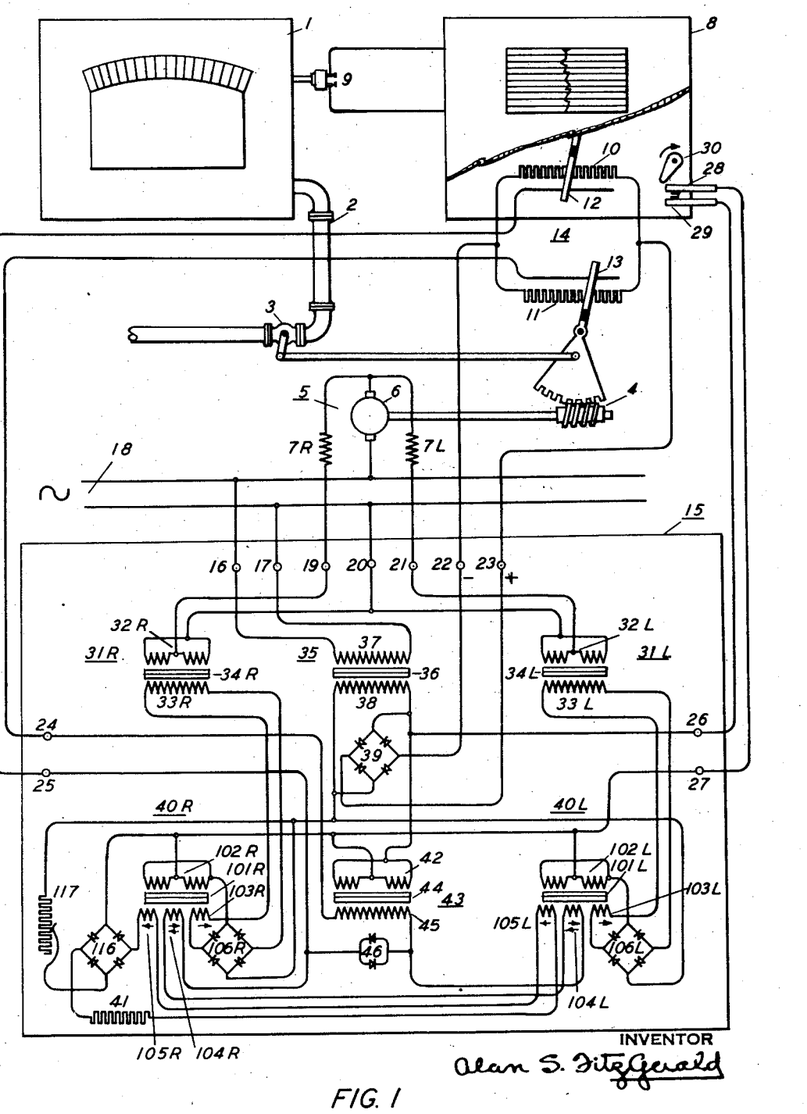
Fig. 1 is an electric circuit diagram representing an embodiment of my invention applied in connection with an automatic temperature control system.

Referring now more particularly to Fig. 1 of the drawings, there is illustrated a temperature control system comprising a furnace 1, supplied through a pipe 2 with fuel, the flow of which is controlled by means of a valve 3. The valve 3 is actuated through a worm gear 4 by means of a motor 5. The motor 5, which may be of the conventional split-series type, has an armature 6 and two field windings 7R and 7L. The suffix designation R and L may conveniently be used with the following significance. When the motor is operating with the field winding 7R energized, the direction of rotation is such as to increase the opening of the valve 3 and thereby to raise the temperature of the furnace. Conversely, the field winding 7L when energized produces opposite rotation so as to reduce the valve opening and lower the temperature.

The temperature of the furnace 1 is indicated by a pyrometer 8 which may be of any suitable type such, for example, as the well-known potentiometer arrangement for indicating the E. M. F. of a thermocouple shown on the drawing at 9.

In order to control the opening of the valve 3 so as to maintain the furnace 1 at the desired temperature, it is necessary that the motor 5 be actuated in accordance with the indication of the pyrometer 8.

In temperature control systems of this type, in order to maintain close temperature control, especially to avoid overshooting or "hunting," thereby causing the temperature to fluctuate, it is desirable to control the fuel admission in accordance with the extent to which the temperature of the furnace has departed from the temperature which it is desired should be maintained.

To avoid this effect, an arrangement may be used providing a means for causing the opening of the valve 3 to be proportional to the displacement, from the position which corresponds to the desired temperature, of the movable element of the potentiometer. The movable element referred to is the member which carries the slidewire contact and to which is attached the indicating pointer or pen, if the instrument be of the graphic type.

In other words, to secure good temperature control, there is required a remote control system for the transmission of mechanical movement or displacement for causing the position of the valve 3 to be at all times controlled so as to correspond proportionally with the position of the potentiometer slidewire contact.

One method of accomplishing this result is to provide two additional slidewire resistances, 10 and 11, the former mounted in the pyrometer 8 and the latter in the valve-operating mechanism. A slide contact 12 mechanically but not electrically connected with the movable member of the potentiometer 8 effects contact with the resistance 10 at a position dependent upon the temperature indication of 8. A second sliding contact 13 makes connection in a similar manner with the resistance 11 at a position dependent upon the opening of the valve 3 as determined by rotation of motor 5.

The resistances 10 and 11 and the slide contacts 12 and 13 are connected together, as shown in the figure, so as to comprise an electrical bridge system 14. This bridge arrangement may be so adjusted by suitable control means that so long as the bridge is maintained in a balanced condition, the position of valve 3 will correspond exactly with the position of the potentiometer pointer or pen.

My improved system for controlling the operation of the motor 5, so as automatically to keep the bridge in balance, is shown in the drawings at 15 and comprises terminals 16 and 17 for receiving energy from a source 18 and terminals 19, 20 and 21 for connecting the motor 5 to the source 18. Two further terminals 22 and 23 supply energy to the bridge 14. Terminals 24 and 25 are connected to contacts 12 and 13 and, therefore, receive the difference or out-of-balance voltage of the bridge 14. A further pair of terminals 26 and 27 are connected to a pair of intermittently operated contacts 28 and 29 the purpose of which will be hereinafter set forth.

My control system 15 includes a pair of saturating reactors 31R and 31L having, respectively, A. C. (alternating-current) windings 32R and 32L, D. C. (direct-current) windings 33R and 33L, and cores 34R, 34L. These reactors are so constructed that when the cores are saturated by current in the D. C. winding, the impedance of the A. C. winding is materially reduced. For a more complete description of this type of saturable core reactor, reference is made to my above-mentioned Patent #2,027,312. As shown in the figure, the A. C. windings 32R and 32L are connected, respectively, in series with the fields 7R and 7L of the motor. Thus, if D. C. saturating current is caused to flow in the D. C. winding 33R but not in 33L, the impedance of the A. C. winding 32R will be substantially reduced but the impedance of 32L will remain high. This will cause the motor 5, in effect, to be connected to the source 18 through field 7R, since field 7L will receive a negligibly small current. The motor will therefore operate with the direction of rotation such as to increase the opening of the valve 3 and to raise the temperature. Conversely, if D. C. saturating current be supplied to 33L instead of 33R, the opening of the valve 3 will be reduced and the temperature lowered.

The action of my control system is arranged to control the operation of the motor 5, through the reactors 31R, 31L, in accordance with the condition of balance of the bridge 14. So long as the bridge is exactly balanced, the value of the direct current flowing in both 33R and 33L is extremely small, such that no substantial saturating effect is produced. The reactance, therefore, of the A. C. windings 32R, 32L is high and substantially no current flows in the motor 5 through either of the field windings 7R, 7L. Thus, the motor is under this condition substantially deenergized. The motor, therefore, remains at a standstill when the bridge is in balance.

Included in the control circuit 15, I show also in the figure a transformer 35 having a core 36 and a primary winding 37 connected through terminals 16, 17, to the source 18. The transformer 35 has a secondary winding 38 for supplying energy, which may be of a reduced voltage, to operate arrangements for energizing the bridge 14 and for supplying direct current for saturating the motor control reactors 31R, 31L. The bridge 14 is energized through terminals 22, 23 with unidirectional current from a rectifier 39 connected to receive alternating current from winding 38.

When the bridge becomes unbalanced, due to the furnace temperature being above the required value, direct current is caused to flow in the saturating winding 33L causing the motor to reduce the valve opening and lower the temperature. When the temperature is reduced to the desired value and the bridge again becomes balanced, the motor stops and the valve opening remains at this setting. Similarly, if the temperature falls below the desired value, causing the bridge to become unbalanced in the opposite sense, direct current is caused to flow in the saturating winding 33R, thereby raising the temperature.

For setting up the above-mentioned saturating direct current, as required in the above-described manner, very sensitive control devices are necessary for the following reasons. In view of the fact that the resistance 10 is to be mounted in a measuring instrument case in which any appreciable heat loss is precluded, the bridge 14 may only be energized to a limited extent. It has been found with heat control systems of the type described that, in order to secure the desired result and to completely avoid fluctuations, the movement of the valve 3, and therefore the sliding contact 13, must follow the motion of 12 very closely to within one or two per cent of the full extent of travel of 12 or 13. In one representative temperature control system the total power dissipated in the bridge 14 was of the order of one watt. It is, therefore, evident that means for controlling selectively the saturating reactors 31R and 31L in accordance with the departure from balanced conditions of the bridge 14 must be capable of responding to very minute amounts of out-of-balance power and of being responsive selectively in accordance with the polarity of the said out-of-balance power.

In order to secure the required nicety of control it was found necessary to use equipment capable of polarized response at a power level of about 20 microwatts.

To accomplish this result in my present invention, I have found that there may be employed with great advantage the polarized saturating reactor system disclosed in my aforesaid Patent #2,027,312.

For a more complete description of this system, reference may be had to the specification of the above cited patent. Briefly, this system comprises a saturating reactor having an alternating current reactance winding and a plurality of direct-current saturating windings. One of the saturating windings receives unidirectional current from a rectifier connected to carry the current flowing in the reactance winding. In another of the saturating windings a unidirectional current of a substantially constant appropriate value is caused to flow. Sensitive response in accordance with the polarity with which the third saturating winding is energized results from this arrangement.

Referring again to Fig. 1, I provide two saturating reactor systems 40R and 40L, each substantially a duplicate of the apparatus shown in Fig. 1 of my above cited patent. Thus, 40R and 40L comprise magnetic cores 101R, 101L, reactance windings 102R, 102L and direct-current saturating windings 103R, 103L, 104R, 104L, 105R, 105L. The cores 101R, 101L may with advantage consist of a high permeability nickel alloy.

Saturating windings 103R, 103L are energized with rectified current from rectifiers 106R, 106L, the alternating current terminals of which are connected in series with the windings 102R, 102L.

A single rectifier 116 supplies rectified current to both of the windings 105R and 105L. The value of this current may be adjusted by means of the variable resistance shown at 117. Due to certain parasitic currents tending to flow on account of slight transformer effects between windings 103R, 105R and 103L, 105L, I find it an advantage to include in series with windings 105R and 105L an additional resistance 41.

The two windings 104R, 104L, connected in series in opposite sense, receive, through terminals 24, 25, the out-of-balance bridge voltage.

The systems 40R, 40L, as shown, are energized in parallel from the transformer secondary winding 38; 40R and 40L are connected directly to 38 when terminals 26 and 27 are shorted by contacts 28 and 29. When 28 and 29 are open the two systems 40R, 40L are energized from 38 in series with the reactance winding 42 of a further saturating reactor 43, having a core 44 and direct-current saturating winding 45, the purpose of which will be more fully described hereinafter. Winding 45 is connected in series with windings 104R, 104L through terminals 24, 25, to contacts 12 and 13 of bridge 14. Winding 45 is, therefore, energized with direct current, which may be of either polarity, in proportion to the amount to which the bridge 14 departs from the balanced condition.

With this arrangement of connections, when either of the systems 40R or 40L is energized with out-of-balance voltage of a particular polarity from the bridge 14 applied to windings 104R, 104L, the current flowing in windings 103R, 103L will be very small. This effect occurs due to the coupling arrangement with winding 102R and 102L; but if the bridge be unbalanced in the opposite direction, giving reverse polarity, the current flowing in 103R, 103L will be of substantial magnitude.

Windings 103R, 103L, respectively, are connected in series with windings 33R, 33L. Thus, the saturating reactors 31R, 31L are saturated by the output current of the systems 40R, 40L.

The resistance 117 is adjusted so that when the bridge is exactly balanced, both 40R, 40L deliver to 33R and 33L small currents insufficient to produce any appreciable saturating effect and the motor does not operate.

When the bridge becomes unbalanced due to the furnace reaching a temperature above the desired value, the out-of-balance current from the bridge, flowing in 104R, 104L, causes no increase in current in respect of 40R but, 104L being connected in opposite sense with respect to 104R, 40L delivers substantial saturating current to winding 33L, causing the motor to operate to reduce the opening of the valve 3 and bring about a reduction in the temperature of the furnace.

The reverse effect is, in similar manner, produced when the temperature falls, the opening of the valve 3 being increased and the temperature in due course being restored to the desired value.

It will be seen, therefore, that under normal operating conditions, movement of the sliding contact 13 in conjunction with the position of the valve 3, very closely follows the displacement of 12. The bridge, therefore, is automatically maintained in a balanced condition and the out-of-balance voltage, existing transiently between the terminals 24, 25 during the brief periods of time while the motor 5 is in operation to provide corrective action, is relatively small.

Under certain abnormal conditions, such as may arise as a result of a prolonged power outage, it is possible for the sliding contacts 12 and 13 to become displaced to a substantial extent from their normal relationship. For example, if power fails while the furnace is heating, leaving the valve 3 fully open, on the resumption of the supply, the furnace having cooled off, 13 will be in the position corresponding to the open position of 3, whereas, 12 will be in a position corresponding to a temperature substantially below the desired value. At the instant of reestablishment of power supply, therefore, the bridge may be out-of-balance to the maximum possible extent. There will, therefore, be applied to terminals 24, 25 a voltage which may be more than 100 times the normal operating voltage. I have found it advantageous to provide, in parallel with windings 104R, 104L a protective by-pass device 46 comprising a non-linear conducting element of any known and suitable type. I have found that ordinary copper oxide rectifier elements connected for bilateral conduction, since the voltage applied to 24, 25 is of reversible polarity, are very suitable for this purpose. Due to the above-mentioned non-linear characteristic of these elements, the device 46 limits the energization of 104R, 104L to a safe value under the above cited abnormal condition. On the other hand, under normal operating conditions, when the voltage between terminals 24 and 25 is very low, the device 46 becomes, in effect, a non-conductor so that substantially the whole of the current delivered to terminals 24 and 25 flows in windings 104R, 104L. Thus, the device 46 under normal conditions has no detrimental effect whatever upon the responsive sensitivity of the system.

The function of the additional saturating reactor 43 and the intermittently operating contacts 28 will now be described. It is convenient to designate the reactor 43 as the "accelerator" and to refer to the contacts 28, 29 as the "inching" contacts.

As explained above, in order to secure close and steady temperature control, a high order of sensitivity is required. In automatic control systems having an operating motor involving the elements of inertia and momentum of rotating members, any attempts to provide regulation within very close limits is usually attended by considerable difficulties in avoiding hunting due to the tendency which occurs for the motor to coast through the balance point causing over-running. The use of the arrangement, including the accelerator 43 and inching contacts 28, 29, makes possible the achievement of the maximum degree of sensitivity which the apparatus is inherently capable of providing, apart from any considerations in connection with over-shooting or hunting difficulties, which latter are completely eliminated.

In order better to explain the specific arrangement I have adopted for this purpose, it may be in point briefly to refer to the nature of the tendency to said over-running and hunting, the causes thereof, and their effect upon performance and sensitive in systems of the type described.

In any motor-operated mechanism involving gearing, the combined effects of inertia, momentum and friction bring about a condition wherein the amount of power applied to the motor, necessary to start it from standstill, is likely to be several times as great as that which will maintain it in motion when running.

It is possible largely to eliminate hunting of the motor 5 by any means which causes the energization of the motor to taper off as the balance point is approached and this result I accomplish by means of the accelerator 43. Under conditions such that the bridge is approximately balanced, the currents flowing through windings 104R, 104L and 45 through terminals 24, 25, being relatively small, the core 44 of the accelerator 43 is not substantially saturated and the winding 42 has appreciable reactance. Assuming for the purpose of explanation the absence of the inching contact, terminals 26 and 27 being open, systems 40R, 40L operate at reduced energy substantially less than is the case when these are connected directly to winding 38. Accordingly, the current in 33R or 33L resulting from the small unbalance is materially less than would be the case if the systems 40R, 40L were fully energized by the voltage of the secondary winding 38.

With increased amount of unbalance proportionately larger current flows in 45, which it will be observed on referring to Fig. 1, is not bypassed by 46, and saturation of 44 occurs as a result of which the energization of the systems 40R, 40L more nearly approximates that of the full voltage of the winding 38.

If the bridge 14 be unbalanced to a substantial extent, the accelerator becomes fully saturated and the systems 40R and 40L operate substantially at the full voltage of 38. It is therefore seen that the action of the accelerator 43 is to cause the energization of motor 5 to be roughly proportional to the extent to which the bridge 14 is unbalanced.

This action tends to avoid hunting difficulties inasmuch as the motor is automatically slowed down as it approaches the balance point, thus curbing the tendency toward overrunning. This action alone, however, may spoil the sensitivity in view of the considerations indicated above in respect of friction and inertia when starting the motor. In view of the fact that the action of the accelerator 43 is such that the energization of the motor 5 tends to be proportional to the amount of unbalance of the bridge, it is evident that any frictional or other effects tending to increase the power necessary to start the motor will result in proportionately increased bridge unbalance before the motor energization reaches the level necessary to overcome the mechanical resistance of the gearing and other mechanism. I, therefore, connect to terminals 26, 27 the inching contacts 28, 29, so as intermittently to short circuit the winding 42. This periodic closing of contacts 28, 29, may be effected by means of a cam 30 which is rotated in timed sequence by a suitable motor. This motor may be the usual one provided for driving the recording sheet of a recording indicator. Thus, irrespective of the accelerator, the systems 40R, 40L are for brief periods at regular intervals operated at the full voltage of the secondary winding 38.

Under conditions when the bridge 14 is in exact balance, the energization of the systems 40R, 40L therefore fluctuates periodically between the full voltage of 38 and a substantially reduced voltage. Due to the action of the systems 40R, 40L, as hereinbefore described, there is no appreciable current flowing in 104R, 104L, no effective saturating current flows in 33R, 33L and the motor 5 is inoperative, whether contacts 28, 29 are closed or open. If, due to a slight change in temperature of the furnace 1 the bridge becomes unbalanced, one or the other of the systems 40R, 40L will deliver current to 33R or 33L. During the alternate periods, while the contacts 28 and 29 are open, the current in 33R or 33L may be too small to develop sufficient starting torque in the motor 5 to overcome the frictional resistance of the mechanism. The momentary closing of the contacts 28, 29 immediately increases the energization of 5 to the full extent, enabling the motor readily to start and readjust the position of 13. The period during which the contacts 28, 29 intermittently remain open may desirably be not less than the length of time which the motor 5 tends to coast when deenergized. Thus, when operating in the immediate vicinity of the balance point, the motor does not run continuously but is "inched" by the contacts 28, 29 and no overshooting results.

It will be apparent that the provision of the contacts 28, 29 alone, in the absence of the winding 42, would be sufficient to prevent difficulty due to hunting. This feature alone, however, would materially increase the time taken to accomplish a displacement of 13 of substantial extent. It is found that in furnaces of the type which are intermittently opened for charging or withdrawal, resulting in substantial change in the demand for fuel, movement of the contact 13 over a substantial portion of the full possible range may be necessary at full operating speed of the motor 5 in order to secure good operating results.

The combined results, therefore, of the accelerator 43 and the inching contacts 28 and 29 operating in conjunction are such that the motor 5 is substantially fully energized, due to the action of the accelerator 43, not only when the contacts 28 and 29 are closed but also when they are opened, whenever any substantial unbalancing of the bridge takes place. Thus, when furnace conditions require a relatively extensive re-positioning of the contact 13, the motor 5 operates continuously irrespective of the inching contacts 28 and 29. On the other hand, when the bridge 14 is balanced or unbalanced to a relatively small extent, the accelerator 43 is substantially inoperative and the inching contacts are fully effective to limit any tendency to hunt.

The frequency of operation of the contacts 28 and 29 and the relative duration of the closed and open period depends principally on the mechanical characteristics of the motor 5 and upon the load imposed thereon by the valve 3 and operating mechanism. The more lightly the motor 5 be loaded and the greater the tendency to coast, the shorter should be the closed period in relation to the open period of the contacts 28, 29. If the valve 3 is of a heavy type, imposing a greater load upon the motor, the contacts 28 and 29 should be closed for relatively longer periods. I have found that in one representative embodiment of my invention rotation of the cam 30 at speeds of the order of one revolution per second and with adjustment made so that the contacts 28 and 29 were closed for approximately ¼ second and open approximately ¾ second, gave good results.

It is to be particularly noted that the periodic variation in the energization of the systems 40R and 40L, due to the action of the contacts 28, 29, results in further advantages in addition to the elimination of hunting. I have found that the sensitivity of response of the systems 40R, 40L is materially increased if these systems are first energized at a low voltage, the voltage being subsequently increased to a higher value.

Figure 2:
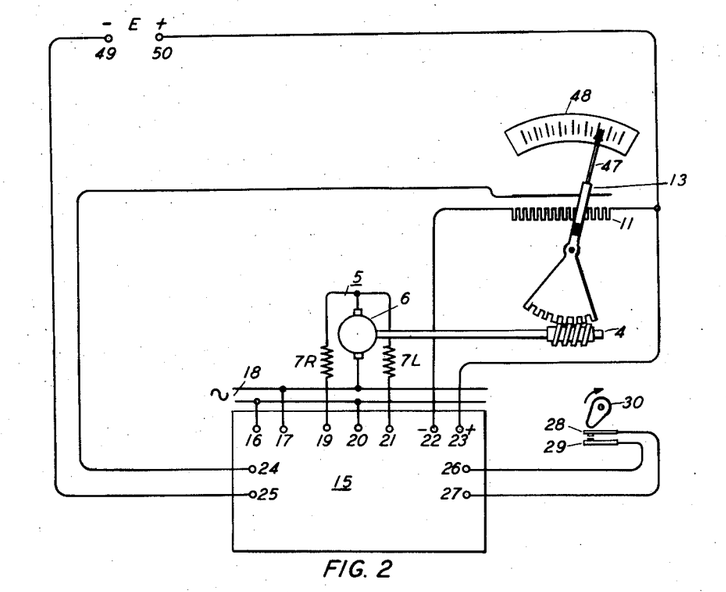
Fig. 2 is a diagrammatic illustration of another embodiment of my invention used in connection with a measurement system.

I show in Fig. 2 a further application of my invention in connection with electrical measuring systems. Arrangements for measuring many physical, chemical and electrical quantities embody instrumentalities for giving an indication in accordance with the magnitude of a small E. M. F. derived directly or indirectly from the quantity to be measured. Representative examples of such systems include resistance measurement, temperature indication, pH measurement and many other systems well-known to those skilled in the art.

In Fig. 2, I show my control circuit 15, having terminals 16, 17, 19, 20, 21, 22, 23, 24, 26, 27, all as shown in Fig. 1. In order to simplify the drawing, the various saturating reactors, rectifiers and connections included in 15 are omitted in Fig. 2, it being understood that in the latter figure the circuit 15 includes all apparatus and components shown therein in Fig. 1.

In Fig. 2, I also show a motor 5, having an armature 6 and fields 7R, 7L and a supply circuit 18, all as in Fig. 1 and connected in like manner to terminals 16, 17, 19, 20, 21. In Fig. 2, I show likewise a resistance 11 and sliding contact 13. The resistance 11 is shown connected directly to terminals 22, 23 and is accordingly to be energized with rectified current. Filtering means, not shown on the drawings, may, if desired, be included between terminals 22, 23 and resistance 11. Means for indicating the position of 13 as, for example, a pointer 47 and scale 48, are provided in Fig. 2. The sliding contact 13 is connected as in Fig. 1 to terminal 24. Between the right-hand extremity of the resistance 11 and terminal 25, I connect a pair of further terminals 49 and 50 to which latter may be connected such source of E. M. F. as it may be the function of the measurement system to indicate. For example, terminals 49, 50 may be connected to a thermocouple or the like.

In Fig. 2 inching contacts 28 and 29, operated by the cam 30, are provided for the purpose explained above in reference to Fig. 1.

It will be apparent that my control circuit 15, functioning as hereinbefore described, will operate the motor 5 so as, from time to time, to reposition sliding contact 13 in accordance with variations in the voltage E applied to terminals 49, 50. The value of the voltage E will accordingly be indicated by the pointer and scale 47, 48.

While I have shown, in Fig. 1, a control unit 15 comprising only two elements, or stages, as 31R, 40R, for each direction of rotation, this number of stages being sufficient for the sensitivity required, I wish it to be clearly understood that, without departing from the spirit of my invention, I may use, for purposes such as the arrangement shown in Fig. 2, as many additional intermediate stages as may be necessary in accordance with the degree of sensitivity required.

In this manner sensitivity much greater than that required in respect of the embodiment illustrated in Fig. 1 may be achieved, and I have constructed apparatus of the type described responsive selectively to power levels substantially less than one-thousandth of a micro-watt.

Figure 3:
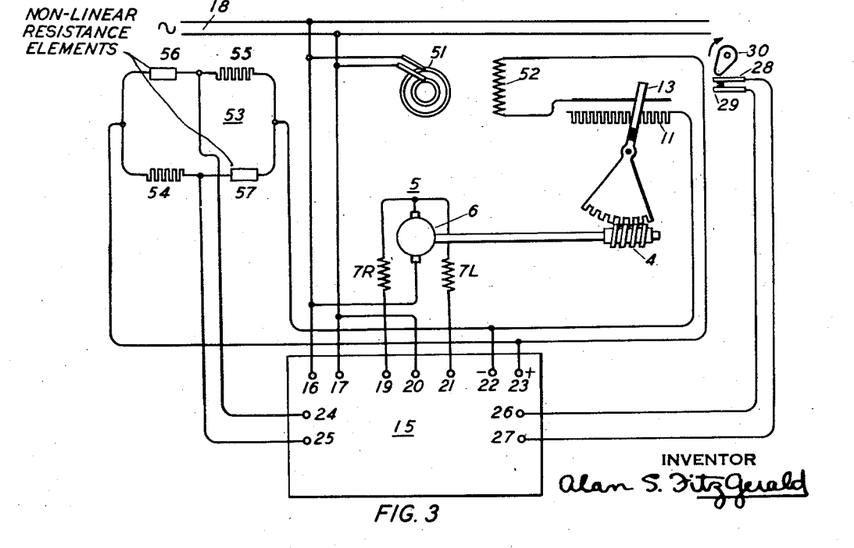
Fig. 3 is another electric circuit diagram of a further embodiment of my invention illustrating the use of my invention in an automatic voltage regulating system.

I show in Fig. 3 a further application of my invention in connection with a regulating system of the well-known type, comprising a bridge circuit, including linear and non-linear elements. It will be recalled by those skilled in the art that bridge systems of this type, when energized by a voltage which it is desired to regulate to a predetermined value, may be arranged to balance at the desired voltage and to provide an out-of-balance voltage which has one polarity when the voltage to be regulated exceeds the desired value and the opposite polarity when the voltage is below the value which it is desired to maintain.

I show, therefore, in Fig. 3 my control circuit 15, having terminals for connection to external circuits, all exactly as enumerated in Fig. 1, but omitting the internal components of 15 which are fully shown in Fig. 1.

I show in Fig. 3 an alternating current supply circuit 18, supplied from an alternator 51, having a field 52, energized from any convenient source of unidirectional voltage as, for example, by connection to terminals 22, 23. I include in series with the field 52 an adjustable resistance 11 having a sliding contact 13 the position of which may be varied through gearing 4 by means of motor 5, having an armature 6 and fields 7R, 7L, all as shown in Fig. 1, and likewise connected to the supply circuit 18 and terminals 19, 20 and 21. In like manner the supply circuit 18 is connected to terminals 16, 17.

Terminals 22, 23 are connected across a diagonal of a bridge circuit 53, comprising two linear resistance elements 54, 55 and two non-linear resistance elements 56, 57. The non-linear resistance elements 56, 57 may be of any suitable material known to those skilled in the art, such as a metal filament enclosed in an inert gas. I consider to be especially suitable for use in practicing my invention a ceramic material described in United States Letters Patent #1,822,742. Across the bridge at the junction points 55, 56 and 54, 57, between which the out-of-balance voltage of the bridge 53 is set up, are connected terminals 24, 25.

It will be noted on reference to Fig. 1 that rectified voltage applied to the bridge 53 is derived, through terminals 22, 23, from the rectifier 38 which latter is energized from the secondary winding 38 of transformer 35. The primary winding 37 of the transformer 35 is energized through terminals 16, 17 through the circuit 18, supplied from the alternator 51. Accordingly, the voltage of the bridge 53 is proportional to the voltage of 18.

In accordance with the explanation of the operation of my invention given in reference to Fig. 1, the control circuit 15 will operate the motor 5 so as automatically to maintain the bridge 53 in balance.

If the voltage of the supply circuit 18 rises above the desired value, this will unbalance the bridge 53 and terminals 24, 25 will receive a very small voltage of one polarity. According to the functioning of my control system 15, as above described, this will cause the motor 5 to operate, field 7L being effective, the direction of rotation being such as to move the contact 13 toward the left, thereby cutting in additional resistance 11. This decreases the current in the field 52 and brings about a reduction in the alternator voltage together with a proportionate reduction in the voltage applied to bridge 53 which latter result causes a reduction in the out-of-balance voltage of the bridge. As soon as the out-of-balance voltage is decreased to zero, the motor 5 ceases to operate. The bridge now being in balance, the current in 52 remains at the value which gives the alternating voltage which it is desired to maintain.

In the event that the voltage of 18 falls below the desired value, similar action in opposite sense takes place to restore the bridge to balance and the voltage to the value thereof which it is desired to maintain.

Although I have chosen particular embodiments of my invention for the purpose of explanation, many modifications thereof will be apparent to those skilled in the art to which it pertains. My invention, therefore, is not to be limited except insofar as is necessitated by the prior art and the spirit of the appended claims.

What I claim as new and desire to secure by Letters Patent of the United States is:

1. In a control arrangement, a balanceable circuit, means for deriving a control potential from said circuit having a characteristic dependent upon the direction of departure of said circuit from balance, comprising a magnetic amplifier means having a plurality of alternating current impedance windings, and direct current windings upon which said derived potential is impressed and responsive to aforesaid characteristic thereof for selectively rendering said impedance windings differently effective, means operated in response to the effective condition of said alternating current impedance windings, upon unbalancing of said balanceable circuit, for restoring said circuit balance, and means for controlling said selectively operated means to determine the rate of restoration in dependence upon the amount of displacement from balance of said circuit.

2. In a control arrangement, a balanceable circuit, means for deriving a control potential from said circuit having a characteristic dependent upon the direction of departure of said circuit from balance, comprising a magnetic amplifier means having a plurality of alternating current impedance windings and direct current windings responsive to said derived direct current potential for selectively rendering said impedance windings variably effective, means selectively operated in response to the condition of said alternating current impedance windings upon unbalancing of said balanceable circuit for restoring said circuit balance, means for controlling said selectively operated means to determine the rate of restoration in dependence upon the amount of displacement from balance of said circuit, and means for periodically rendering said means for controlling ineffective.

3. An electrical control circuit comprising an adjustable circuit, means responsive to a change in adjustment of said adjustable circuit for unbalancing said circuit in one of two senses, saturable core means provided with an impedance winding and a saturating winding, means for deriving from said circuit in response to said unbalance condition electrical energy variable in characteristic dependent upon the sense of the unbalance, means for variable energizing the saturating windings by said derived energy for rendering said saturable core means responsive in accordance with the characteristic of the energy, means for adjusting said adjustable circuit, and means connecting said impedance winding to said adjusting means for restoring said circuit to balance.

4. In a control arrangement, a balanceable circuit, means for deriving a direct current potential from said circuit with a polarity dependent upon the direction of departure from balance, comprising a magnetic amplifier means having a plurality of alternating current impedance windings and direct current windings upon which is impressed said derived direct current potential for selectively rendering said impedance windings differently effective, and means selectively operated in response to the effective condition of said alternating current impedance windings upon unbalancing of said balanceable circuit for restoring said circuit balance.

5. In a control arrangement, a balanceable circuit, means for deriving a direct current potential from said circuit with a polarity dependent upon the direction of departure of said circuit from balance, comprising a magnetic amplifier means having a plurality of alternating current impedance windings, and direct current windings upon which is impressed said derived direct current potential for selectively rendering said impedance windings differently effective, means selectively operated in response to the effective condition of said alternating current impedance windings, upon unbalancing of said balanceable circuit, for restoring said circuit balance, and means for controlling said selectively operated means to determine the rate of restoration in dependence upon the amount of displacement from balance of said circuit.

6. In a control arrangement, a balanceable circuit, means for deriving a direct current potential from said circuit with a polarity dependent upon the direction of departure from balance, comprising a magnetic amplifier means having a plurality of alternating current impedance windings and direct current windings responsive to said derived direct current potential for selectively rendering said impedance windings variably effective, means selectively operated in response to the condition of said alternating current impedance windings upon unbalancing of said balanceable circuit for restoring said circuit balance, means for controlling said selectively operated means to determine the rate of restoration in dependence upon the amount of displacement from balance of said circuit, and means for periodically rendering said means for controlling ineffective.

7. A control circuit comprising, a normally balanced electrical circuit, means associated with said balanced circuit for producing an unbalanced condition thereof in either of two directions, means for deriving a direct current in response to said unbalance having a characteristic variably dependent upon the direction of unbalance, driving means coupled to said balanced circuit for restoring said circuit to balance, and means for controlling said driving means, comprising saturable core means provided with a saturating winding and an impedance winding, means for effecting energization of said saturating winding by the direct current derived from said balanced circuit, energization of said saturating winding varying the effectiveness of said alternating current impedance winding, and a control connection between said alternating current impedance winding and said driving means whereby said restoring operation is rendered effective.

8. An electrical control circuit comprising an adjustable normally balanced circuit arrangement, means responsive to a change in conditions for unbalancing said circuit in one of two senses, saturable core means provided with an alternating current impedance winding and a direct current saturating winding energized by the circuit in response to said unbalance current of said circuit, variable in polarity dependent upon the sense of the unbalance, for rendering said saturable core means selectively responsive in accordance with the polarity of said current, means for adjusting the balance of said normally balanced circuit, and means connecting said alternating current winding to said adjusting means for restoring said circuit to balance.

9. An electrical control circuit comprising an adjustable normally balanced circuit arrangement, means responsive to a change in conditions for unbalancing said circuit in one of two senses, saturable core means provided with an alternating current impedance winding and a direct current saturating winding, means for deriving from said circuit in response to said unbalance condition electrical energy variable in polarity dependent upon the sense of the unbalance, means for variably energizing the direct current saturating windings by said derived energy for rendering said saturable core means selectively responsive in accordance with the polarity of the energy, means for adjusting the balance of said normally balanced circuit, means connecting said alternating current winding to said adjusting means for restoring said circuit to balance, and saturable core means operatively associated with said last named means for controlling the rate of restoration directly in accordance with the amount of displacement.

10. A system comprising means operative to produce variable conditions, a balanceable electrical system, means responsive to said variable conditions for oppositely varying the balance of said system, means for deriving directly from said system, direct current having a polarity dependent upon the direction of unbalance of said system, a saturable core means having an alternating current reactance winding and a direct current saturating winding variably energized by said derived current of direction of unbalance of the system, the alternating current reactance winding of said saturable core means being selectively differently effective dependent upon the polarity of the saturating current, means for varying said balanceable system in a direction tending to restore said system to balance, and connections between said saturable core means and said last named means for controlling operation of said last named means, whereby said balanceable system is automatically restored to balance.

11. A circuit comprising a bridge circuit, means responsive to variations in conditions for changing the balance of said bridge circuit in accordance with the nature of said variations, means connected across said bridge circuit for producing a direct current the polarity of which depends on the direction of the change of balance of said bridge circuit, two saturable core devices each having a direct current saturating winding and an alternating current impedance winding, means for energizing said saturating windings by said current to render the corresponding alternating current impedance winding effective to different extents in dependence upon the polarity of said current, a control means for changing the balance of said bridge means to compensate for the changes due to said variations, and means responsive to the rendering of the alternating current impedance winding differently effective for conditioning said control means for operation.

12. A circuit comprising a bridge circuit, means responsive to variations in conditions for changing the balance of said bridge circuit in accordance with the nature of said variations, means connected across said bridge circuit for producing a direct current potential the polarity of which depends on the direction of the change of balance of said bridge circuit, two saturable core devices each having a direct current saturating winding and an alternating current impedance winding, saturable core means energized by said direct current for selectively differently energizing said saturating windings depending on the polarity of said current thereby rendering the corresponding alternating current impedance winding effective to different extents, a control means for changing the balance of said bridge means to compensate for the changes due to said variations, means responsive to the rendering of the alternating current impedance windings differently effective for conditioning said control means for operation, and means responsive to the amount of unbalance of said circuit for controlling the rate of operation of said control means.

13. A circuit comprising a bridge circuit, means responsive to variations in conditions for changing the balance of said bridge circuit in accordance with the nature of said variations, means connected across said bridge circuit for producing a direct current potential the polarity of which depends on the direction of the change of balance of said bridge circuit, two saturable core devices each having a direct current saturating winding and an alternating current impedance winding, saturable core means energized by said direct current for selectively differently energizing said saturating windings depending on the polarity of said current thereby rendering the corresponding alternating current impedance winding effective to different extents, a control means for changing the balance of said bridge means to compensate for the changes due to said variations, means responsive to the rendering of the alternating current impedance windings differently effective for conditioning said control means for operation, and impedance means directly variable in accordance with the amount of unbalance for controlling the rate of operation of said control means.

14. A circuit comprising a bridge circuit, means responsive to variations in conditions for changing the balance of said bridge circuit in accordance with the nature of said variations, means connected across said bridge circuit for producing a direct current potential the polarity of which depends on the direction of the change of balance of said bridge circuit, two saturable core devices each having a direct current saturating winding and an alternating current impedance winding, means responsive to said produced direct current for selectively differently energizing said saturating windings depending on the polarity of said current thereby rendering the corresponding alternating current impedance winding effective to different extents, a control means for changing the balance of said bridge means to compensate for the changes due to said variations, means responsive to the rendering of the alternating current impedance windings differently effective for conditioning said control means for operation, impedance means responsive to the amount of unbalance of said circuit for controlling the rate of operation of said control means, and means for periodically short circuiting said impedance means.

15. A system comprising means operative to produce variable conditions, a balanceable electrical system, means responsive to said variable conditions for oppositely varying the balance of said system, means for deriving energy from said system, having a polarity dependent upon the direction of unbalance of said system, a saturable core means having an alternating current reactance winding and a direct current saturating winding, means for variably energizing said saturating winding with current of a polarity dependent upon the polarity of said derived energy, the alternating current reactance winding of said saturable core means being selectively differently effective dependent upon the polarity of the saturating current, a work device, and means connecting said reactance winding to control said work device in accordance with said unbalance.

16. A system comprising means operative to produce variable conditions, a balanceable electrical system, means responsive to said variable conditions for oppositely varying the balance of said system, means for deriving energy from said system, having a polarity dependent upon the direction of unbalance of said system, a saturable core means having an alternating current reactance winding and a direct current saturating winding, means for variably energizing said saturating winding with current of a polarity dependent upon the polarity of said derived energy, the alternating current reactance winding of said saturable core means being selectively differently effective dependent upon the polarity of the saturating current, means for varying said balanceable system in a direction tending to restore said system to balance, and connections between said saturable core means and said last named means for controlling operation of said last named means, whereby said balanceable system is automatically restored to balance, and means for periodically varying the energization of said reactance winding so as to increase the responsiveness of said saturable core means to said unbalance.

17. In a motor control system, an electrical motor, a variable control impedance, a variable follow-up impedance, means connecting said variable follow-up impedance to said motor and operative to vary the value of said impedance in accordance with the position of said motor, a saturable core amplifier having a magnetic core structure and output and saturating windings on said core structure, means connecting said saturating winding with said control and follow-up impedances to a source of power and operative to energize said saturating winding in accordance with the values of both said control impedance and said follow-up impedance, and means controlled by said output winding for controlling the energization of said motor.

18. In a motor control system, an electrical motor, a variable control impedance, a variable follow-up impedance, means connecting said variable follow-up impedance to said motor and operative to vary the value of said impedance in accordance with the position of said motor, a saturable core amplifier having a magnetic core structure and output and saturating windings on said core structure, means connecting said saturating winding with said control and follow-up impedances to a source of power and operative to energize said saturating winding in accordance with the values of both said control impedance and said follow-up impedance, and means including said output winding for energizing said motor.

19. In a motor control system, an electrical motor, a variable control impedance, a variable follow-up impedance, a saturable core amplifier having a magnetic core structure and output and saturating windings on said core structure, a source of power, means to connect said saturating winding and said control and follow-up impedances to said source of power in circuit with each other, whereby the energization of said saturating winding is controlled by the concurrent values of said two impedances, means controlled by said output winding for controlling the energization of said motor, and means operatively connected with said motor for varying the value of said follow-up impedance in a direction opposite to the change in the value of the control impedance which produced the movement of the motor.

20. In a motor control system, an electrical motor, a variable control impedance, a variable follow-up impedance, a balanced impedance network comprising said impedances, a saturable core amplifier having a magnetic core structure and output and saturating windings on said core structure, a source of power, means connecting said saturating winding with said impedance network to said source of power in such a manner that the energization of said saturating winding is controlled by the amount of unbalance of said network, means controlled by said output winding for controlling the energization of said motor, and means operatively connected with said motor for varying the value of said follow-up impedance in a direction and to an extent to rebalance the impedance network.

21. In a motor control system, a reversible electrical motor having two energizing circuits, the energization of one of which tends to cause the motor to rotate in one direcion and the energization of the other of which tends to cause the motor to rotate in the opposite direcion, a variable control impedance, a variable follow-up impedance, a balanced impedance network comprising said impedances, a saturable core amplifier having a magnetic core structure and output and saturating windings on said core structure, a source of power. means connecting said saturating winding with the said impedance network to said source of power in such a manner that the energization of said saturating winding is controlled by the amount of unbalance of said network, means including said output winding for controlling the energization of one of said energizing circuits of said motor to control the extent and direction of rotation of said motor, and means operatively connected with said motor for varying the value of said follow-up impedance in a direction and to an extent to rebalance the impedance network.

22. In a motor control system, a reversible electrical motor having two opposed field windings which upon energization thereof tend to cause rotation of the motor in opposite directions, an energizing circuit for each of said field windings, a variable control impedance, a variable folllow-up impedance, a balanced impedance network comprising said impedances, a saturable core amplifier having a magnetic core structure and output and saturating windings on said core structure, a source of power, means connecting said saturating winding with said impedance network to said source of power in such a manner that the energization of said saturating winding is controlled by the amount of unbalance of said network, means including said output winding for controlling the energization of one of said field winding energizing circuits to control the extent and direction of rotation of said motor, and means operatively connected with said motor for varying the value of said follow-up impedance in a direction and to an extent to rebalance the impedance network.

23. In a motor control system, a reversible electrical motor having two energizing circuits, the energization of one of which tends to cause the motor to rotate in one direction and the energization of the other of which tends to cause the motor to rotate in the opposite direction, a variable control impedance, a variable follow-up impedance, a balanced impedance network comprising said impedances, a pair of saturable core amplifiers, each having a magnetic core structure and output and saturating windings on said core structure, a source of power, means connecting said saturating windings with said impedance network to said source of power in such a manner that when said network is balanced said saturating windings are equally energized and when said network is unbalanced, one of said saturating windings is more highly energized than the other, depending upon the direction of unbalance, means including one of said output windings for controlling each of said motor energizing circuits, and means operatively connected with said motor for varying the value of said follow-up impedance in a direction and to an extent to rebalance the impedance network.

24. In a motor control system, a reversible electrical motor having two opposed field windings which upon energization thereof tend to cause rotation of the motor in opposite directions, an energizing circuit for each of said field windings, a variable control impedance, a variable follow-up impedance, a balanced impedance network comprising said impedances, a pair of saturable core amplifiers, each having a magnetic core structure and output and saturating windings on said core structure, a sourse of power, means connecting said saturating windings with said impedance network to said source of power in such a manner that when said network is balanced said saturating windings are equally energized and when said network is unbalanced, one of said saturating windings is more highly energized than the other, depending upon the direction of unbalance, means including one of said output windings for controlling each of said field winding energizing circuits, and means operatively connected with said motor for varying the value of said follow-up impedance in a direction and to an extent to rebalance the impedance network.

25. In a motor control system, a reversible electrical motor having two energizing circuits, the energization of one of which tends to cause the motor to rotate in one direction and the energization of the other of which tends to cause the motor to rotate in the opposite direction, a control potentiometer, a follow-up potentiometer, each of which comprises a relatively movable contact member and potentiometer, a pair of saturable core amplifiers, each having a magnetic core structure and output and saturating windings on said core structure, a source of power, means connecting said saturating windings in series with each other and in circuit with said control and follow-up potentiometers and said source of power to form a normally balanced network in which said saturating windings are equally energized, means including one of said output windings for controlling each of said motor energizing circuits, and means operatively connected with said motor for varying the setting of said follow-up potentiometer in a direction and to an extent to rebalance the impedance network.

26. In a motor control system, a reversible electrical motor having two opposed field windings which upon energization thereof tend to cause rotation of the motor in opposite directions, an energizing circuit for each of said field windings, a control potentiometer, a follow-up potentiometer, each of which comprises a relatively movable contact member and potentiometer, a pair of saturable core amplifiers, each having a magnetic core structure and output and saturating windings on said core structure, a source of power, means connecting said saturating windings in series with each other and in circuit with said control and follow-up portentiometers and said source of power to form a normally balanced network in which said saturating windings are equally energized, means including one of said output windings for controlling each of said field winding energizing circuits, and means operatively connected with said motor for varying the setting of said follow-up potentiometer in a direction and to an extent to rebalance the impedance network.

27. In a motor control system, an electrical motor, a variable control impedance, condition responsive means for adjusting the value of said control impedance, a variable follow-up impedance, means connecting said variable follow-up impedance to said motor and operative to vary the value of said impedance in accordance with the position of said motor, a saturable core amplifier having a magnetic core structure and output and saturating windings on said core structure, means connecting said saturating winding with said control and follow-up impedances to a source of power and operative to energize said saturating winding in accordance with the values of both said control impedance and said follow-up impedance, and means controlled by said output winding for controlling the energization of said motor.

28. In a motor control system, a reversible electrical motor having two energizing circuits, the energization of one of which tends to cause the motor to rotate in one direction and the energization of the other of which tends to cause the motor to rotate in the opposite direction, a control potentiometer, a follow-up potentiometer, each of which comprises a relatively movable contact member and potentiometer, condition responsive means for controlling the setting of said control potentiometer, a pair of saturable core amplifiers, each having a magnetic core structure and output and saturating windings on said core structure, a source of power, means connecting said saturating windings in series with each other and in circuit with said control and follow-up potentiometers and said source of power to form a normally balanced network in which said saturating windings are equally energized, means including one of said output windings for controlling each of said motor energizing circuits, and means operatively connected with said motor for varying the setting of said follow-up potentiometer in a direction and to an extent to rebalance the impedance network.

29. A system comprising a balanceable electrical network, saturable core means comprising an alternating current reactance winding, a direct current saturating winding traversed by unidirectional current of polarity dependent upon the direction of unbalance of said network, and another direct current winding traversed by unidirectional current of fixed polarity, means for intermittently varying the magnitude of unidirectional current traversing said other direct current winding, and means controlled by said saturable core means for restoring balance of said network.

30. A system comprising a balanceable electrical network, saturable core means comprising an alternating current reactance winding, a direct current saturating winding traversed by unidirectional current of polarity dependent upon the direction of unbalance of said network, and another direct current winding traversed by unidirectional current of fixed polarity and of magnitude dependent upon the extent of unbalance of said network, and means controlled by said saturable core means for restoring balance of said network.

31. A system comprising a balanceable electrical network, rectifier means, saturable core means comprising an alternating current reactance winding, a direct current saturating winding traversed by unidirectional current derived from said network, and a direct current winding in circuit with said reactance winding and said rectifier means and effective cumulatively with said saturating winding to vary the effective reactance of said reactance winding, and means controlled by said saturable core means for restoring balance of said network.

ALAN S. FITZ GERALD.